US006211325B1

United States Patent
Sun et al.

(10) Patent No.: US 6,211,325 B1
(45) Date of Patent: Apr. 3, 2001

(54) HIGH STRENGTH PLASTIC FROM REACTIVE BLENDING OF STARCH AND POLYLACTIC ACIDS

(75) Inventors: Xiuzhi S. Sun; Paul Seib; Hua Wang, all of Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 09/549,439

(22) Filed: Apr. 14, 2000

(51) Int. Cl.[7] .......................... C08G 18/10; C08G 18/28; C08G 63/06
(52) U.S. Cl. ................. 528/66; 528/73; 528/361
(58) Field of Search ............................. 523/128; 528/66, 528/73, 361

(56) References Cited

U.S. PATENT DOCUMENTS

| | | | |
|---|---|---|---|
| 5,714,230 | * 2/1998 | Kameoka et al. | 428/141 |
| 5,753,724 | * 5/1998 | Edgington et al. | 523/124 |
| 5,763,098 | * 6/1998 | Kameoka et al | 428/481 |
| 5,961,906 | * 10/1999 | Muller et al. | 264/109 |

FOREIGN PATENT DOCUMENTS 0530987   8/1991  (EP) .

OTHER PUBLICATIONS

S. Jacobson et al., "Filling of Poly(Lactic Acid) With Native Starch", Polymer Engineering and Science, vol. 36, No. 22, pp. 2799–2804, Nov. 1996.

* cited by examiner

*Primary Examiner*—Kriellion Sanders
(74) *Attorney, Agent, or Firm*—Hovey, Williams, Timmons & Collins (57) ABSTRACT

Biodegradable polymers for use in forming high strength, degradable plastics and methods of forming the polymers are provided. Broadly, the methods comprise forming and heating a blended mixture of polylactic acid, a starch, and a linkage group for joining or copolymerizing the polylactic acid and starch. Preferred linkage groups comprise an isocyanate moiety, with diphenylmethylene diisocyanate, hexamethylene diisocyanate, and isophorone diisocyanate. The reacted mixture can then be formed into the desired final product which has high tensile strength, modulus of elasticity, percent elongation, and thermal stability.

49 Claims, 3 Drawing Sheets

HIGH STRENGTH PLASTIC FROM REACTIVE BLENDING OF STARCH AND POLYLACTIC ACIDS

BACKGROUND OF THE INVENTION

1. Field of the Invention

The present invention is broadly concerned with modified synthetic polymer compositions for use in forming high strength, biodegradable plastics and methods of forming such compositions. More particularly, the inventive compositions comprise polylactic acid joined or copolymerized with starch via a linkage or compatabilizing group which comprises a diisocyanate moiety. The invention allows lower quantities of polylactic acid to be utilized while maintaining the biodegradability of polylactic acid-derived plastics and improving their mechanical properties.

2. Description of the Prior Art

Plastics (synthetic resins) are widely used and an important material in current commercial products. As more plastics having varying mechanical properties are developed, industries are finding uses for plastics which only a few years ago would have been unexpected. For example, many automobiles which were previously formed entirely of metal now include plastic components such as plastic body panels. Furthermore, these plastic components are so well-designed that it is generally difficult to visually differentiate between the plastic and steel components on an automobile. In addition to automobile components, plastics find uses in innumerable products including children's toys, kitchen dishes and appliances, packaging materials, and medical products.

While plastics have generally been an inexpensive and efficient material for manufacturing products, they are derived in large part from petroleum resources which are finite and increasing in cost. Thus, it is important to develop new methods and materials for forming plastics as an alternative to the current methods.

Additionally, the environmental impact of discarded plastic objects is of growing global concern due to the fact that disposal methods for such wastes are quite limited. Incineration of the plastic wastes generates toxic air pollution. At the same time, satisfactory landfill sites are limited, and most durable plastics do not biodegrade. There is, thus, a need for durable and biodegradable plastic materials, particularly for short-term use items such as packaging materials and disposable utensils.

Fully biodegradable, synthetic polymers have been commercially available for several years. Such polymers include polylactic acid (PLA), polycaprolactone (PCL), and polyhydroxybutyratevalerate (PHBV). Among these polymers, PLA has been extensively studied in medical implants, sutures, and drug delivery systems. Unlike other available biodegradable synthetic polymers, PLA exhibits promising mechanical properties, thus making it appealing for use as a disposable and biodegradable plastic substitute. However, PLA is costly compared to conventional petroleum-based plastics, and its degradation rate is slow compared to the waste accumulation rate. Finally, another disadvantage of PLA is that its modulus of elasticity decreases by about 85% at temperatures above its glass transition temperatures (60° C.), where it becomes very soft, and thus it has only limited applications.

Starch is a renewable and degradable carbohydrate biopolymer that can be purified from various sources by environmentally sound processes. By itself however, starch has severe limitations in plastic applications due to its water solubility. That is, articles molded from starch will swell and deform upon exposure to moisture. To decrease interaction with water, starch is often blended with hydrophobic polymers which reduce the use of petroleum polymers while simultaneously increasing the biodegradability of the product.

Starch has been blended with synthetic biodegradable polymers such as PCL, PHBV, and poly(hydroxybutyrate) (PHB). However, starch and PLA have not previously been successfully blended because they are immiscible polymers. There is a need for a compatibilizer which can enhance the compatibility of starch and PLA to yield a high-strength biodegradable plastic.

SUMMARY OF THE INVENTION

The present invention overcomes the problems of the prior art by providing novel polymer compositions useful for forming high-strength, degradable plastics. The inventive compositions broadly comprise starch reacted with polylactic acid via compatibilizing or linkage groups.

In more detail, polymer compositions according to the invention are prepared by forming a mixture comprising the starch, polylactic acid, and linkage group and causing the ingredients of the mixture to react such as by heating the mixture to a temperature of at least about 150° C., and preferably at least about 175° C. The heating step should be carried out for at least about 2 minutes, and more preferably from about 3–5 minutes.

The weight ratio of starch:polylactic acid in the mixture should be from about 1:99 to about 70:30, preferably from about 40:60 to about 60:40, and more preferably from about 45:55 to about 50:50. The average molecular weight of the polylactic acid used to prepare the mixture is preferably at least about 70,000 Daltons, and more preferably from about 90,000–140,000 Daltons. Suitable starches include those selected from the group consisting of corn starch, wheat starch, sorghum starch, potato starch, tapioca starch, or any other starch from crops and plants.

The linkage group should comprise at least one isocyanate moiety, and more preferably at least two such isocyanate moieties, with preferred linkage groups being selected from the group consisting of diphenylmethylene diisocyanate, hexamethylene diisocyanate, and isophorone diisocyanate. The most preferred linkage group is diphenylmethylene diisocyanate. The linkage group should be mixed with the starch and polylactic acid at a level of less than about 4% by weight, preferably from about 0.1–2% by weight, and more preferably from about 0.2–0.5% by weight linkage group, based upon the total weight of the starch/polylactic acid/linkage group mixture taken as 100% by weight.

In forming the starch/polylactic acid/linkage group mixture, it is preferred that all of the ingredients simply be mixed together. Alternately, a precursor mixture comprising respective quantities of polylactic acid and of the linkage group is formed, and the precursor mixture is then mixed with the starch and the remainder of the polylactic acid. In these instances, the polylactic acid should be present in the precursor mixture at a level of from about 96–99.9% by weight, and preferably from about 98–99% by weight, based upon the total weight of the precursor mixture taken as 100% by weight.

In another embodiment, a precursor mixture comprising respective quantities of polylactic acid, starch, and the linkage group is formed, and the precursor mixture is then mixed with the remainder of the starch and polylactic acid. In this embodiment, the precursor mixture should comprise from about 30–99% by weight polylactic acid, from about 1–70% by weight starch, and from about 0.1–4% by weight of the linkage group. Even more preferably, the precursor mixture should comprise from about 30–70% by weight polylactic acid, from about 30–70% by weight starch, and from about 1–2% by weight of the linkage group, based upon the total weight of the precursor mixture taken as 100% by weight.

The final prepared polymer composition can then be used to form a plastic in the same manner as prior art plastic-forming processes, including utilizing known additives and plasticizers. For example, the polymer composition can be formed into disposable food utensils, packaging for food, and numerous other plastic items. Advantageously, the inventive methods allow smaller quantities of polylactic acid to be utilized, thus decreasing the cost of the final product compared to prior art plastic products derived from polylactic acid. Furthermore, by using starch with smaller quantities of polylactic acid rather than simply large quantities of polylactic acid alone, the biodegradability of the polylactic acid is not compromised.

The inventive compositions, and the plastics derived therefrom, have highly desirable mechanical properties in general, and have substantially improved mechanical properties when compared to pure polylactic acid or to prior art polylactic acid-derived plastics. For example, the ASTM D638-92 tensile strength of the inventive polymer composition is at least about 50 MPa, preferably at least about 60 MPa, and more preferably from about 40–75 MPa. The ASTM D638-92 percent elongation of the composition is at least about 3%, preferably at least about 4%, and more preferably from about 3–6%. Additionally, the ASTM D638-92 modulus of elasticity of the composition is at least about 1500 MPa, preferably at least about 1800 MPa, and more preferably at least about 1800–2000 MPa.

The crystallinity ($X_c$, described in detail below) of the compositions is at least about 2 times, and more preferably at least about 5 times greater than the crystallinity of pure polylactic acid (i.e., polylactic acid which has not been blended with some other polymer or modifier). Finally, when a polymer composition according to the invention is subjected to four heating cycles (i.e., it is heated to its melting temperature followed by cooling to room temperature, and this cycle is then repeated three times for a total of four cycles) the melting point of the composition during the fourth heating cycle is within about 3° C. of the composition melting point during the first heating cycle. Thus, the melting point of the composition during the fourth heating cycle is preferably 170–175° C.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Example 1

Materials

Polylactic acid (PLA) having a molecular weight of about 120,000 Da and polymerized primarily from L-lactic acid was obtained from Shimadzu, Inc. (Japan). The glass transition temperature of the PLA was about 60° C., and the peak melting temperature was about 172° C.

Wheat starch (Midsol 50) was obtained from Midwest Grain Products, Inc. (Atchison, Kans.). The wheat starch granules contained approximately 75% amylopectin and 25% amylose. The moisture content of the starch was about 11.9%. The starch was oven-dried to a moisture content of about 1% prior to blending with the PLA.

Experimental Design

In this example, three experiments were conducted. In one experiment (hereinafter referred to as "Experiment I"), the PLA was blended with a small amount of diphenylmethylene diisocyanate (MDI) to produce PLA reacted with MDI. Because MDI was used in molar excess to PLA, it was assumed to contain some reactive isocyanate groups and is hereinafter referred to as "activated" PLA. A small amount of the activated PLA was then added to a mixture of starch and PLA and blended. It is believed that the activated PLA interacted with the starch due to the attached isocyanate group, resulting in the PLA's improved compatibility with starch.

In another experiment (hereinafter referred to as "Experiment II"), starch and PLA were blended with a small amount of MDI to produce a "diblock" after which a small amount of the diblock was added to the bulk mixture of starch and PLA. It is believed that the diblock enhanced the compatibility of the starch and PLA.

In a final experiment (hereinafter referred to as "Experiment III"), a small amount of MDI was added to the bulk mixture of starch and PLA, then blended together (i.e., a direct blending method). It is believed that the diblock was formed in situ during blending, resulting in high starch-PLA compatibility.

In each of the above Experiments I–III, the components were pre-mixed under ambient conditions using a general mixer (Kitchen Aid®). All reactive blending was performed by using an intensive mixer (Rheomix 600, Haake, Paramus, N.J.) at 190° C. and 135 rpm for four minutes. The weight ratio of starch to PLA in each of Experiments I–III was 45:55.

Tensile Bar Preparation

Each of the prepared blends were individually compression-molded into tensile bars following ASTM D686-92 and using a Carver Hot Press (3890, Auto "M," Carver, Inc., Wabash, Ind.) at a molding temperature of 176° C. and a molding pressure of 4.2 MPa for 9–15 minutes. The molded specimens were cooled to room temperature and preconditioned at 55% relative humidity (RH) and 22° C. for at least 48 hours before mechanical analyses.

Testing Methods

The mechanical properties of the tensile bars were measured using an Instron testing system (Model 4466, Canton, Mass.) according to the Standard Test Method for Tensile Properties of Plastics (ASTM D638-92). The stress and the percent of strain at the maximum stress were determined.

Differential scanning calorimetry (DSC) analyses were performed to determine the thermal transition measurements (DSC7, Perkin-Elmer, Norwalk, Conn.). The DSC instrument was calibrated using the melting temperature and enthalpy of standard material indium. The dried, ground, blended samples were weighed into an aluminum pan and sealed hermetically. An empty pan was used as a reference. The DSC temperature was increased from 25 to 200° C. at a rate of 10° C./min.

The sum of the enthalpy of the blends at different thermal stages was used as an estimate of the crystallinity ($X_c$) using the following equation from Fisher et al., *Kolloid—Z.U.Z. Polym.*, 251:980–990 (1972):

$$X_c(\%) = (\Delta H_m + \Delta H_{ci}) \cdot 100/(93 \, J/g \cdot X_{PLA}),$$

where: $\Delta H_m$ and $\Delta H_{ci}$ are the enthalpies (J/g) of endotherm of melting and exotherm of crystallization of the blend, respectively; 93 J/g is the enthalpy of fusion of a PLA crystal of infinite size; and $X_{PLA}$ is the PLA content (in percent by weight, based upon the total weight of the sample taken as 100% by weight).

The dynamic mechanical properties were determined using a dynamic mechanical analyzer (DMA-7e, Perkin-Elmer) with a 3-point bending rectangle method at 1 Hz. Storage (G') was analyzed, and the DMA temperature range was increased from 25 to 180° C. at a rate of 5° C./min.

A spectrometer (KBr plate, ATI Mattson Research Series 1 FTIR, Madison, Wis.) was used to obtain infrared spectra of selected samples.

Results and Discussion

1. Experiment I

The data for Experiment I is set forth in Table 1. The tensile strength of the blends with more than 1% MDI and the activated PLA was significantly higher than the blends without the activated PLA. Furthermore, the elongation of the blends improved as the MDI content increased significantly up to 1%. The blend with 10% of the activated PLA containing 1.05% MDI had mechanical properties similar to those of the blend with 5% of the activated PLA containing 2.1% MDI, and the tensile strength was improved by about 54% when compared to the control. This indicates that reactions or interactions between the isocyanate groups from MDI and the hydroxyl or carbonyl groups from PLA or starch likely occur during blending.

TABLE 1

Mechanical properties of starch and PLA blends at 25° C., blends prepared in the presence of activated PLA developed from MDI and one homopolymer PLA[a].

| | Blends | | | |
|---|---|---|---|---|
| MDI in PLA % (w/w) | Activated PLA %[b] | Starch:PLA[c] (w/w) | Tensile strength MPa | Elongation % |
| 0 | 0 | 0:100 | 62.3 ± 2.5 | 5.1 |
| 0 | 0 | 45:55 | 33.0 ± 1.6 | 2.4 |
| 0.42 | 5 | 45:55 | 34.3 ± 3.1 | 2.5 |
| 1.05 | 5 | 45:55 | 44.7 ± 1.4 | 3.3 |
| 1.05 | 10 | 45:55 | 49.8 ± 2.7 | 4.1 |
| 2.1 | 5 | 45:55 | 51.2 ± 4.9 | 4.2 |

[a]Values reported here are averages of five tensile bar tests.
[b]Percent by weight based upon total weight of blend taken as 100% by weight.
[c]Calculated by including the PLA from the activated PLA.

Figure 1:
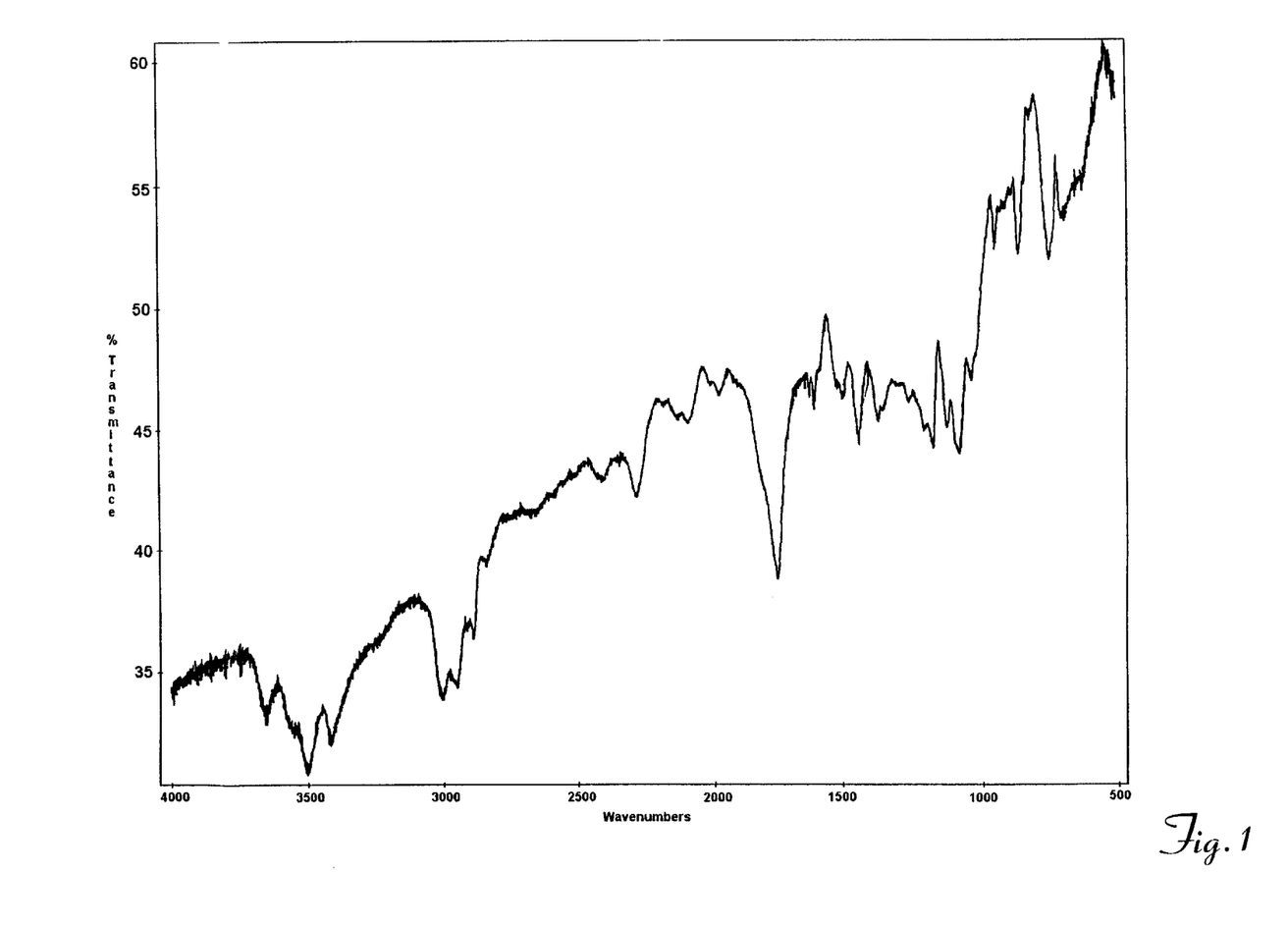
FIG. 1 is an FTIR spectrum of activated polylactic acid (PLA) produced by hot blending 1% MDI with the PLA.
Figure 2:
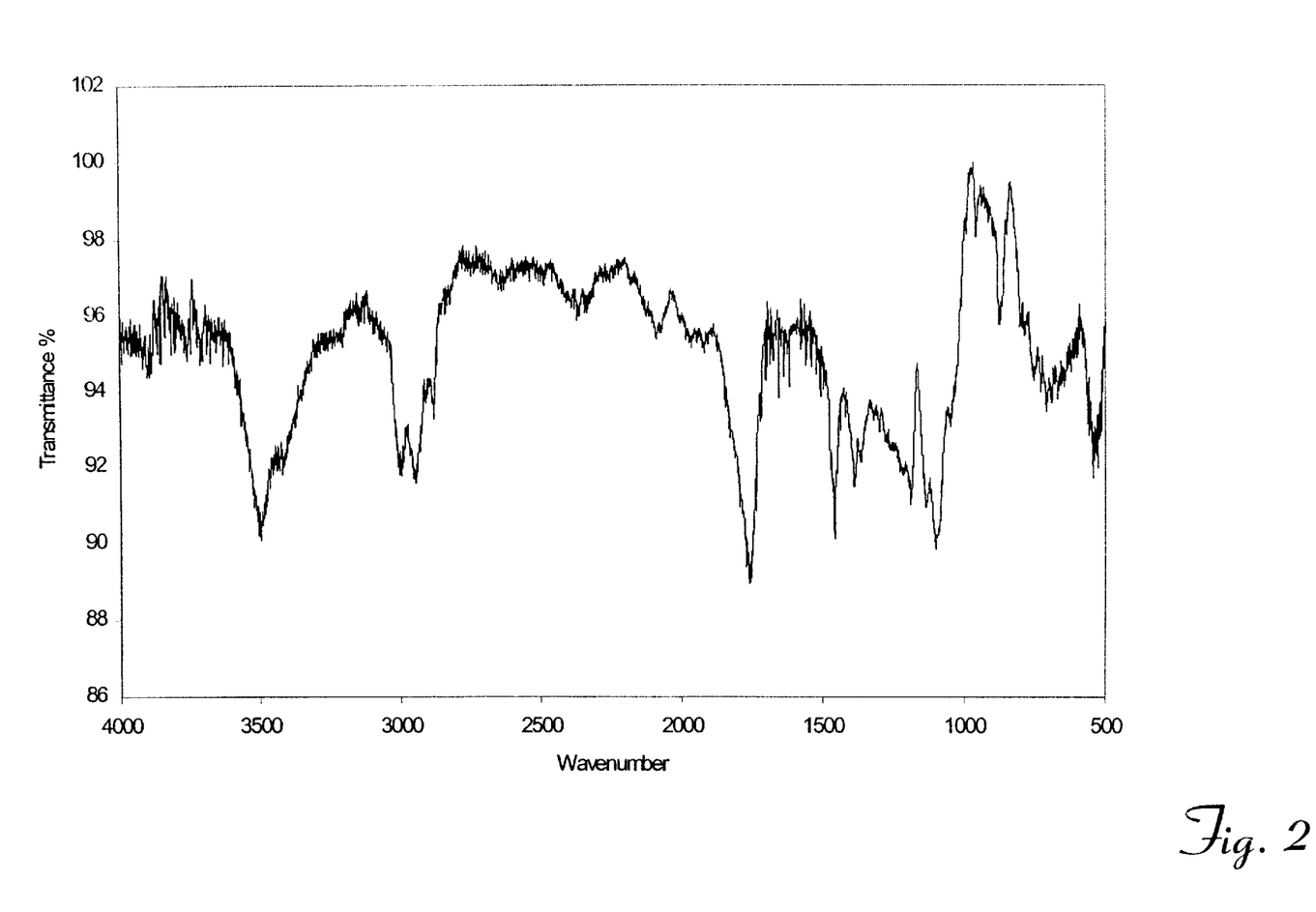
FIG. 2 is an FTIR spectrum of pure PLA.

FIGS. 1 and 2 depict FTIR spectra obtained during this experiment. Three small peaks assigned to amide groups were observed in the spectra. Referring to FIG. 1 which depicts the FTIR spectrum of the activated PLA formed with 1.05% MDI, two small peaks were observed at 1650 and 1526 wave numbers and another peak was observed at 3420 wave numbers, indicating two different stretching vibrations. The peaks at 1650 and 1526 were not present in the pure PLA sample, and the peak at 3420 was not as strong in the pure PLA sample (see FIG. 2). The two peaks at 1650 and 1526 were close to 1655 and 1550 for secondary amide groups associated with large groups attached to a carbonyl, and the peak at 3420 was between 3440 (free) and 3300 (associated) amide groups for the vNH stretching vibration as reported by Nakanishi et al., *Infrared Absorption Spectroscopy,* 2nd ed., Holden-Day, Inc., San Francisco, Calif. (1977). Therefore, it is believed that these three peaks are due to amide or urethane groups formed in situ during blending with PLA.

Again, referring to FIG. 1, a large peak at about 2300 wave numbers was the isocyanate group from MDI which remained after partial reaction with the PLA. The remaining isocyanate groups were expected to react with the hydroxy groups of starch and PLA during blending. The activated PLA had higher thermal stability compared to the pure PLA. The melting temperatures of the pure PLA decreased by about 10° C. after four heating cycles, while they remained almost constant for the activated PLA (see Table 2).

TABLE 2

Melting temperatures of pure PLA and activated PLA with 1% MDI determined by heating cycles in the DSC.

| Samples | $T_m$ starting (° C.) | $T_m$ at the peak (° C.) | $T_m$ ending (° C.) |
|---|---|---|---|
| Pure PLA: | | | |
| 1st heating | 154.8 | 171.1 | 181.0 |
| 2nd heating | 159.9 | 170.9 | 178.3 |
| 3rd heating | 155.4 | 167.2 | 174.3 |
| 4th heating | 141.5 | 163.1 | 170.9 |
| Reactive PLA: | | | |
| 1st heating | 159.2 | 175.7 | 183.9 |
| 2nd heating | 159.6 | 175.3 | 183.1 |
| 3rd heating | 160.1 | 175.1 | 183.6 |
| 4th heating | 156.9 | 175.3 | 183.1 |

2. Experiment II

Table 3 sets forth the data from this example. Both the tensile strength and the elongation of the blends increased as the MDI content in the blends increased and were significantly higher than those of the control blend. At fixed MDI content in the blend, the samples containing activated PLA gave higher tensile strengths and elongations than those containing the pre-formed diblock (see Tables 1 and 3).

TABLE 3

Mechanical properties of starch and PLA blends in the presence of compatibilizer (diblock) developed by blending MDI with the two homopolymers (starch and PLA)[a].

| | Blends | | | |
|---|---|---|---|---|
| MDI in S/P[b] % (w/w) | Diblock %[c] % (w/w) | Starch:PLA[d] | Tensile strength MPa | Elongation % |
| 0 | 0 | 0:100 | 62.3 ± 2.5 | 5.1 |
| 0 | 0 | 45:55 | 33.0 ± 1.6 | 2.4 |
| 1.05 | 5 | 45:55 | 39.3 ± 2.2 | 2.7 |
| 2.06 | 5 | 45:55 | 42.8 ± 3.2 | 3.5 |
| 2.06 | 9.8 | 45:55 | 48.0 ± 3.2 | 3.8 |
| 3.26 | 5 | 45:55 | 45.0 ± 3.9 | 3.4 |

[a]Values reported here are averages of five tensile bar tests.
[b]S/P = Starch and PLA (45/55,w/w) diblock.
[c]% by weight based upon the total weight of the blend taken as 100% by weight.
[d]Calculated by including the starch and PLA from the diblock.

3. Experiment III

In this experiment, the MDI was added directly to the starch and PLA blending system, significantly improving the mechanical properties of the blends (see Table 4). The blend with 0.5% MDI had the highest tensile strength and modulus of elasticity, both of which were even higher than that of pure PLA. The blend with 1% MDI gave the highest elongation among the blends, which was slightly lower than that of the pure PLA. No significant differences in mechanical properties were observed between the 1% and 2% MDI treatments.

TABLE 4

Mechanical properties of starch and PLA blended in the presence of MDI (direct blending)[a].

| MDI %[b] | Starch:PLA (w/w) | Tensile strength (MPa) | Elongation % | Modulus (MPa) |
|---|---|---|---|---|
| 0 | 0:100 | 62.3 ± 2.5 | 5.1 ± 0.35 | 1536 ± 83 |
| 0 | 45:55 | 35.7 ± 1.6 | 2.6 ± 0.27 | 1720 ± 125 |
| 0.25 | 45:55 | 61.6 ± 3.5 | 4.3 ± 0.55 | 1870 ± 88 |
| 0.5 | 45:55 | 66.6 ± 3.3 | 4.4 ± 0.3 | 1972 ± 161 |
| 1 | 45:55 | 64.9 ± 2.6 | 4.8 ± 0.59 | 1941 ± 90 |
| 2 | 45:55 | 65.3 ± 3.4 | 4.5 ± 0.31 | 1920 ± 72 |

[a]Values reported here are averages of five tensile bar tests.
[b]Percent by weight based upon the total weight of the MDI/starch/PLA mixture taken as 100% by weight The molecular weight of MDI is quite small compared to the respective molecular weights of the PLA and starch. At 1% MDI by weight in a blend of starch:PLA at a weight ratio of 45:55, the mole ratio of MDI to PLA was about 10, which would provide sufficient isocyanate groups to react with all hydroxy or carboxyl groups. These results indicate that diblocks linking starch to PLA were randomly formed in situ during blending, and the diblocks then enhanced starch and PLA compatibility. The activated PLA and diblocks produced in Experiments I and II as discussed above might have been degraded due to exposure to excess thermal processing, resulting in a lower compatibility than the diblock formed in situ.

The modulus of elasticity of the starch and PLA blend without MDI was higher than that of pure PLA, which is typical of a continuous matrix with a filler. In this instance, the PLA provided a continuous matrix phase, and the starch served as a filler, resulting in a composite with reduced strength and reduced elongation which is, therefore, more brittle. In addition to the modulus of the starch/PLA/MDI blend being significantly higher than that of pure PLA, the tensile strengths of the blends were higher or equal to that of pure PLA. In these instances, the starch did not act as a filler but instead as a compatible polymer through the action of the MDI.

Figure 3:
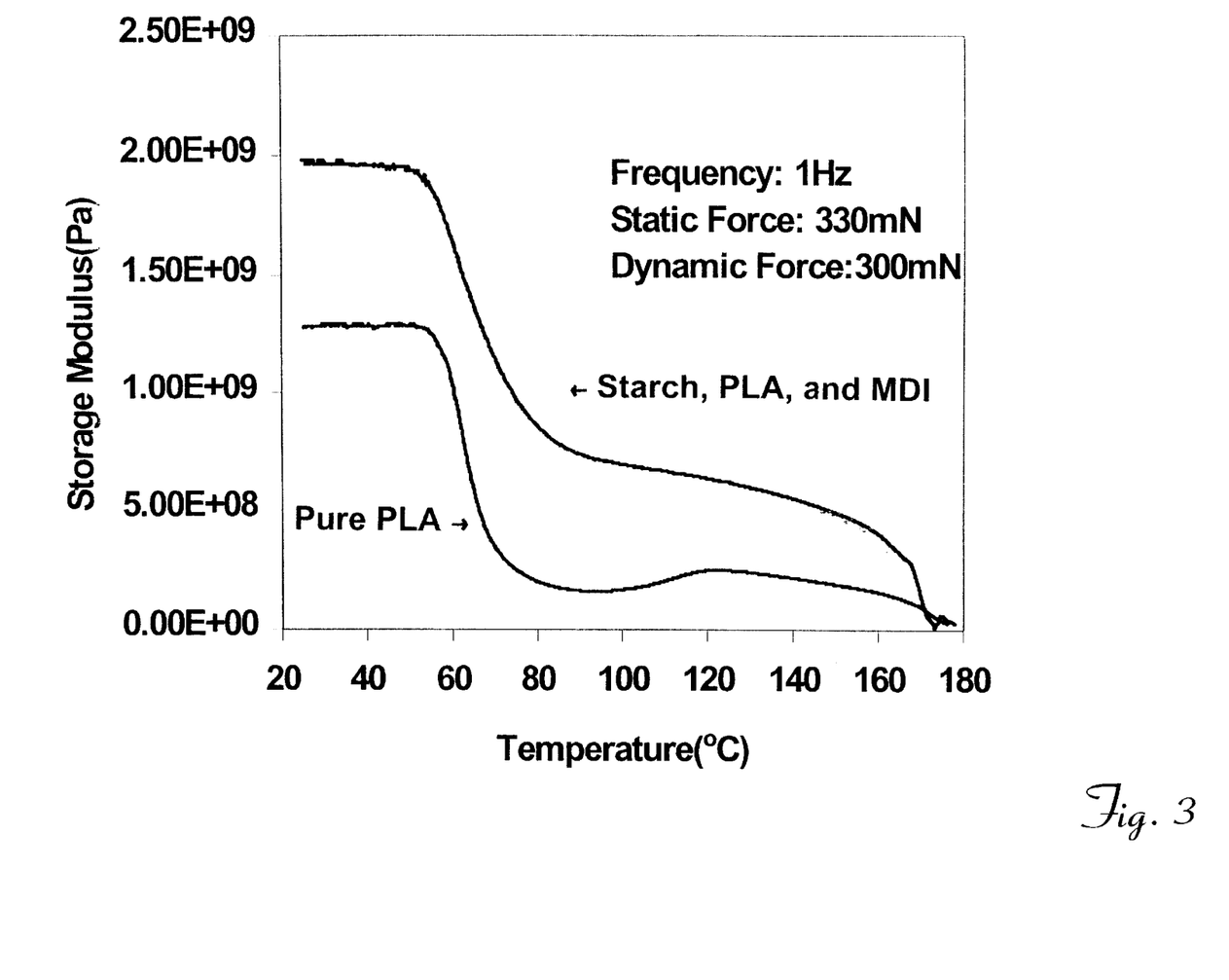
FIG. 3 is a graph comparing the dynamic storage modulus of pure PLA to a sample comprising starch and PLA blended with MDI.

The crystallinity of the starch and PLA samples blended with 1% MDI was about 8 times higher than that of the pure PLA (see Table 5) and was about 3.7 times higher after recrystallization (i.e., after the second and third heating cycles). As shown in FIG. 3 the dynamic storage modulus of the blend with 1% MDI was higher than that of pure PLA at both room temperature and above glass transition temperature. The storage modulus of the pure PLA above its glass transition temperature was about 200 MPa, which was approximately the consistency of a soft rubber upon removing the PLA from boiling water. The blend with 1% MDI had a storage modulus above its glass transition temperature of about 700 MPa, and the blend was stiff after removing it from boiling water.

TABLE 5

Crystallinity ($X_c$ %) of pure PLA (after molding) and starch and PLA blends (45:55) with 0.5% MDI (direct blending) as estimated by DSC measurements.

| Samples | 1st heating[a] | 2nd heating[b] | 3rd heating[b] |
|---|---|---|---|
| Pure PLA | 7.3 | 7.1 | 7.4 |
| Blend | 59.25 | 26.0 | 23.7 |

[a]Crystals were formed during processing.
[b]Crystals were melted and then reformed during cooling in the DSC pan.

4. Thermal Stability Test

A PLA, starch, and MDI blend was prepared by direct blending as described in Experiment III, with the weight ratio of starch:PLA being 45:55 and the blend containing 1% by weight MDI. The prepared sample was then subjected to a total of four heating cycles wherein during each cycle, the sample was heated to its melting point, then allowed to cool to room temperature. Table 6 sets forth the melting points of the blend during each heating cycle as compared to pure PLA. The melting point of the blend remained nearly unchanged, through the heating cycles indicating that the inventive blend had high thermal stability.

TABLE 6

Melting point of pure PLA (after molding) and starch and PLA blends (45:55) with 1.0% MDI (direct blending) during four heating cycles.

| Samples | 1st heating | 2nd heating | 3rd heating | 4th heating |
|---|---|---|---|---|
| Pure PLA | 172° C. | 171° C. | 168° C. | 166° C. |
| Blend | 176° C. | 175° C. | 175° C. | 175° C. |

5. Reaction Scheme

The structures of PLA, MDI, and an exemplary starch repeat unit are depicted in Formulas I–III, respectively.

Formula I

Formula II

Formula III

It is believed that the PLA molecule reacts with the MDI molecule as shown in either Scheme A or Scheme B. In either case, the starch molecule then reacts with the MDI molecule as also shown in Scheme A and Scheme B.

Scheme A

-continued

Scheme B

Example 2

A starch/PLA blend (45/55) was prepared using 0.5% by weight MDA following the procedure of Experiment III. All of the processing conditions and procedures were the same as described in Example 1, except that the starch utilized had a moisture content of about 10% by weight. After the sample was prepared, the tensile strength and percent elongation were determined as described in Example 1. The tensile strength of the blend was about 55 MPa, and the elongation was about 4.3%.

Example 3

A PLA starch blend was prepared utilizing hexamethylene diisocyanate (HDI) as the compatibilizer and following the direct blending method described in Experiment III of Example 1. The weight ratio of starch:PLA was 45:55 and the percent by weight of HDI was 1%, based upon the total weight of the starch/PLA/HDI mixture taken as 100% by weight. After the sample was prepared, the tensile strength and percent elongation were determined as described in Example 1. The tensile strength was 52 MPa, and the elongation was 3.51%.

We claim:

1. A method of preparing a biodegradable polymer composition utilized in forming plastic articles, said method comprising the steps of:
   forming a mixture comprising starch, polylactic acid, and a linkage group comprising an isocyanate moiety; and
   causing said starch, polylactic acid, and linkage group to react to yield the polymer.

2. The method of claim 1, wherein said causing step comprises heating said mixture to at least about 150° C.

3. The method of claim 1, wherein said polylactic acid has an average molecular weight of at least about 70,000 Daltons.

4. The method of claim 1, wherein said starch is selected from the group consisting of corn starch, wheat starch, sorghum starch, potato starch, and tapioca starch.

5. The method of claim 1, wherein said linkage group is selected from the group consisting of compounds comprising two isocyanate moieties.

6. The method of claim 1, wherein said heating step is carried out for at least about 2 minutes.

7. The method of claim 1, wherein said mixture comprises less than about 4% by weight of said linkage group, based upon the total weight of the mixture taken as 100% by weight.

8. The method of claim 1, wherein the weight ratio of starch:polylactic acid is from about 1:99 to about 70:30.

9. The method of claim 1, wherein said forming step comprises forming a precursor mixture comprising respective quantities of polylactic acid and said linkage group and mixing said precursor mixture with said starch and a second quantity of said polylactic acid.

10. The method of claim 9, wherein said polylactic acid is present in said precursor mixture at a level of from about 96–99.9% by weight, based upon the total weight of the precursor mixture taken as 100% by weight.

11. The method of claim 1, wherein said forming step comprises forming a precursor mixture comprising respective quantities of polylactic acid, starch, and said linkage group, and mixing said precursor mixture with respective second quantities of starch and polylactic acid.

12. The method of claim 11, wherein said precursor mixture comprises from about 30–99% by weight polylactic acid, from about 1–70% by weight starch, and from about 0.1–4% by weight of said linkage group, said percentages by weight being based upon the total weight of the precursor mixture taken as 100% by weight.

13. The method of claim 1, wherein the tensile strength of the polymer is at least about 50 MPa.

14. The method of claim 1, wherein the percent elongation of the polymer is at least about 3%.

15. The method of claim 1, wherein the modulus of elasticity of the polymer is at least about 1500 MPa.

16. The method of claim 1, wherein the crystallinity of the polymer is at least about 2 times greater than the crystallinity of polylactic acid.

17. The method of claim 1, wherein the melting point of the polymer varies by less than about 3° C. after four heating cycles when compared to the first heating cycle.

18. A biodegradable polymer composition utilized in forming plastics, said composition comprising a starch and polylactic acid reaction product, said composition having a tensile strength of at least about 50 MPa.

19. The polymer of claim 18, wherein said starch and polylactic acid reaction product comprises a starch molecule joined with a polylactic acid molecule via a linkage group.

20. The polymer of claim 19, wherein said linkage group comprises two isocyanate moieties.

21. The polymer of claim 20, wherein said linkage group is selected from the group consisting of diphenylmethylene diisocyanate and hexamethylene diisocyanate.

22. The polymer of claim 18, wherein said starch is selected from the group consisting of corn starch, wheat starch, sorghum starch, potato starch, and tapioca starch.

23. The polymer of claim 18, wherein the weight ratio of starch:polylactic acid in said starch and polylactic acid reaction product is from about 1:99 to about 70:30.

24. The polymer of claim 19, wherein said polymer comprises less than about 4% by weight of said linkage group, based upon the total weight of the polymer taken as 100% by weight.

25. The polymer of claim 18, wherein the modulus of elasticity of said polymer is at least about 1500 MPa.

26. The polymer of claim 18, wherein the percent elongation of the polymer is at least about 3%.

27. The polymer of claim 18, wherein the crystallinity of the polymer is at least about 2 times greater than the crystallinity of polylactic acid.

28. A biodegradable polymer composition utilized in forming plastics, said composition comprising a starch and polylactic acid reaction product, said polymer having a modulus of elasticity of at least about 1500 MPa.

29. The polymer of claim 28, wherein said starch and polylactic acid reaction product comprises a starch molecule joined with a polylactic acid molecule via a linkage group.

30. The polymer of claim 29, wherein said linkage group comprises two isocyanate moieties.

31. The polymer of claim 30, wherein said linkage group is selected from the group consisting of diphenylmethylene diisocyanate and hexamethylene diisocyanate.

32. The polymer of claim 28, wherein said starch is selected from the group consisting of corn starch, wheat starch, potato starch, and tapioca starch.

33. The polymer of claim 28, wherein the weight ratio of starch:polylactic acid in said starch and polylactic acid reaction product is from about 1:99 to about 70:30.

34. The polymer of claim 29, wherein said polymer comprises less than about 4% by weight of said linkage group, based upon the total weight of the polymer taken as 100% by weight.

35. The polymer of claim 28, wherein the modulus of elasticity of said polymer is at least about 1500 MPa.

36. The polymer of claim 28, wherein the percent elongation of the polymer is at least about 3%.

37. The polymer of claim 28, wherein the crystallinity of the polymer is at least about 2 times greater than the crystallinity of polylactic acid.

38. A biodegradable polymer composition utilized in forming plastics, said composition comprising:

a quantity of polylactic acid including a plurality of recurring monomers;

a quantity of starch including a plurality of recurring monomers; and a linkage group bonded to at least one of said polylactic acid monomers and to at least one of said starch monomers.

39. The polymer of claim 38, wherein said polylactic acid has an average molecular weight of at least about 70,000 Daltons.

40. The polymer of claim 38, wherein said starch is selected from the group consisting of corn starch, wheat starch, sorghum starch, potato starch, and tapioca starch.

41. The polymer of claim 38, wherein said linkage group comprises two isocyanate moieties.

42. The polymer of claim 41, wherein said linkage group is selected from the group consisting of diphenylmethylene diisocyanate and hexamethylene diisocyanate.

43. The polymer of claim 38, wherein said polymer comprises less than about 4% by weight of said linkage group, based upon the total weight of the polymer taken as 100% by weight.

44. The polymer of claim 38, wherein the weight ratio of starch:polylactic acid in said polymer is from about 1:99 to about 70:30.

45. The polymer of claim 38, wherein the tensile strength of the polymer is at least about 50 MPa.

46. The polymer of claim 38, wherein the percent elongation of the polymer is at least about 3%.

47. The polymer of claim 38, wherein the modulus of elasticity of the polymer is at least about 1500 MPa.

48. The polymer of claim 38, wherein the crystallinity of the polymer is at least about 2 times greater than the crystallinity of polylactic acid.

49. A plastic product formed from a polymer according to claim 38.

\* \* \* \* \*

UNITED STATES PATENT AND TRADEMARK OFFICE
CERTIFICATE OF CORRECTION

PATENT NO. : 6,211,325 B1
DATED : April 3, 2001
INVENTOR(S) : Xiuzhi S. Sun; Paul Seib; Hua Wang It is certified that error appears in the above-identified patent and that said Letters Patent is hereby corrected as shown below:

Column 8,
Under Scheme A, the "N" located directly under "H$_2$" should be a -- C. --

Signed and Sealed this

Sixth Day of November, 2001

Attest:

NICHOLAS P. GODICI
Attesting Officer
Acting Director of the United States Patent and Trademark Office